United States Patent [19]
Meade et al.

[11] Patent Number: 5,573,641
[45] Date of Patent: Nov. 12, 1996

[54] METHOD FOR PREVENTING MICROBIAL DEPOSITS IN THE WET END OF PAPERMACHINES USING ETHYLENE OXIDE/PROPYLENE OXIDE COPOLYMER

[75] Inventors: Robert J. Meade, Naperville; Linda R. Robertson, St. Charles; Nicole R. Taylor, Berkeley, all of Ill.

[73] Assignee: Nalco Chemical Company, Naperville, Ill.

[21] Appl. No.: 430,629

[22] Filed: Apr. 28, 1995

[51] Int. Cl.⁶ ...................................................... D21H 17/52
[52] U.S. Cl. ......................... 162/158; 162/160; 162/161; 162/168.1; 162/199; 162/DIG. 4
[58] Field of Search ........................... 162/4, 199, DIG. 4, 162/5, 164.3, 164.1, 168.1, 158, 160, 161

[56] References Cited

FOREIGN PATENT DOCUMENTS 7015801  8/1965  Japan .

*Primary Examiner*—Peter Chin
*Assistant Examiner*—Dean T. Nguyen
*Attorney, Agent, or Firm*—James J. Drake; Robert A. Miller; Patricia A. Charlier

[57] ABSTRACT

A method of removing and preventing the build-up deposit-forming microorganisms in a papermachine fluid, the method comprising the step of treating the fluid with an aqueous, the aqueous solution including from about 0.1 to about 35 parts per million of an ethylene oxide/propylene oxide copolymer having a molecular weight of from about 2500 to about 3550 daltons.

5 Claims, 3 Drawing Sheets

FIG. 1

| | COMPOUND B | COMPOUND C | COMPOUND D | COMPOUND E | COMPOUND A |
|---|---|---|---|---|---|
| Average Response | 2.88 | 2.80 | 2.72 | 2.50 | 0.60 |

Dose 5 ppm

METHOD FOR PREVENTING MICROBIAL DEPOSITS IN THE WET END OF PAPERMACHINES USING ETHYLENE OXIDE/PROPYLENE OXIDE COPOLYMER

BACKGROUND OF THE INVENTION

1. Field of the Invention

The present invention is directed to a method for preventing and removing the formation of deposits by microorganisms as well as, organic and nonorganic materials in the wet end of a papermachine and other industrial water systems.

2. Description of the Prior Art

The growth of microorganisms in papermachine fluids can adversely affect finished paper products. The microorganisms stick to surfaces and collect other material used in papermaking such as organic and nonorganic fillers and wood fibers found in papermachine fluids to form deposits. The resulting deposits can slough and cause sheet defects, holes or paper sheet breaks. These problems require the papermachine to be shut down, resulting in the loss of productivity brought on by the down time of the machine.

Traditionally, biocides have been successfully used to control the growth of microorganisms and reduce the formation of deposits caused by such microorganisms. Unfortunately, the traditionally used biocides are costly and often toxic. Desirably, a compound that is low in cost and less toxic to the environment would be available for the treatment of papermachine fluids. The compound would have to be easily dispersed in water, have low foaming tendencies and reduce both biological and chemical fouling.

SUMMARY OF THE INVENTION

A method of preventing the attachment of deposit-forming microorganisms on papermachine surfaces in contact with fluids, the method comprising the step of treating the fluid with an aqueous solution, the aqueous solution including from about 0.1 to about 100 parts per million of an ethylene oxide/propylene oxide copolymer having a molecular weight of from about 2500 to about 3550 daltons.

BRIEF DESCRIPTION OF THE DRAWINGS

FIG. 1 is a graph comparing the efficacy of various molecular weight EOPO polymers at a 5 ppm dosage.

DESCRIPTION OF THE PREFERRED EMBODIMENTS

Figure 2:
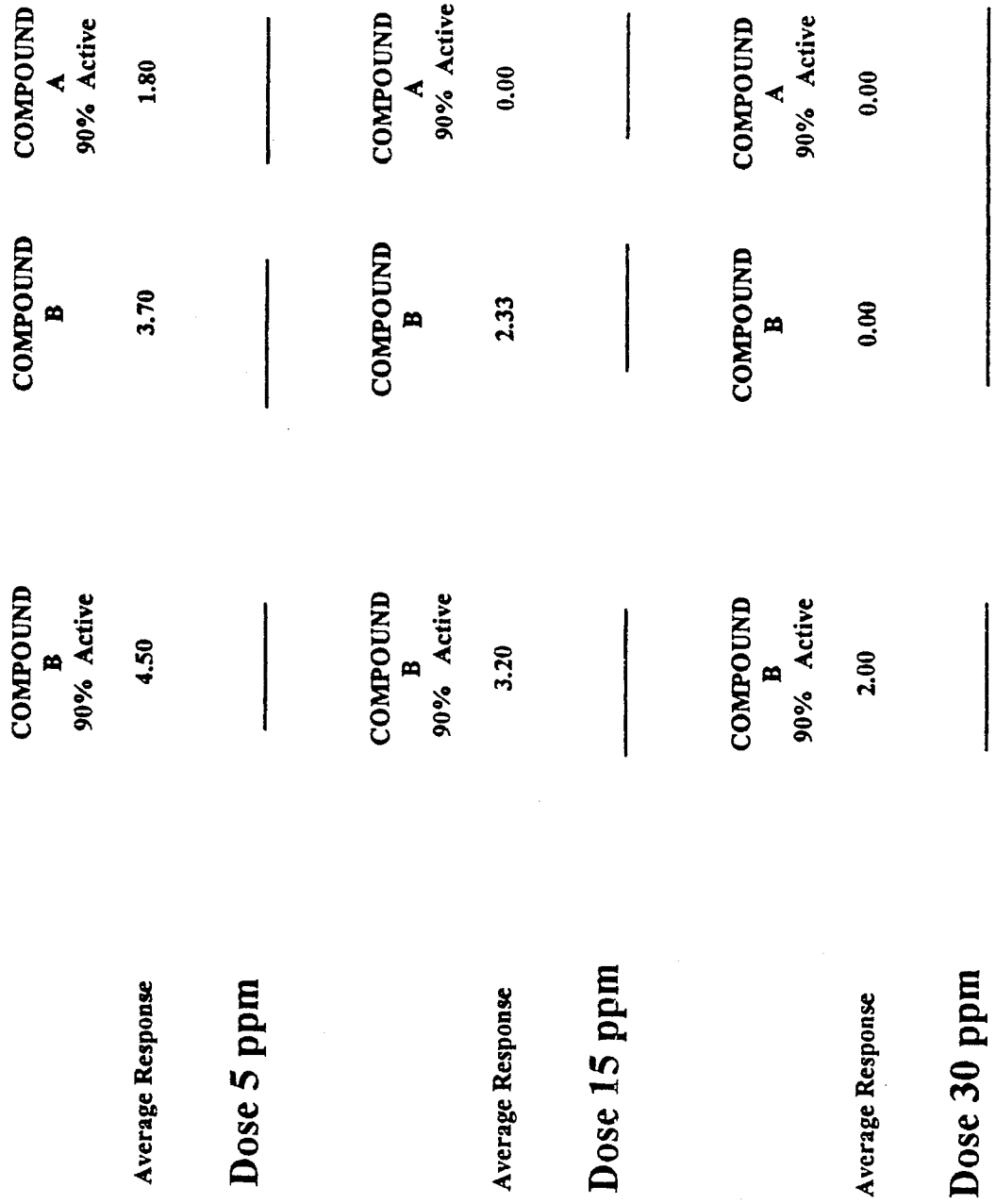
FIG. 2 is a graph comparing the efficacy of two different EOPO polymers at various dosages.

The present invention provides a method of preventing the buildup of microorganisms, wood fiber and fillers on paper machine surfaces. It is generally noted in the industry that contaminants, such as microorganisms, wood fiber and fillers, can reduce the efficiency of a papermachine. The present invention, which is not a biocide, and has no biocidal effect, provides an improved method for the prevention of microbial adhesion to papermachine surfaces and the formation of a biofilm.

According to one general embodiment of the invention, the invention provides a method of preventing the buildup of filamentous and single-celled bacteria and other microorganisms, wood fibers and fillers on paper machine surfaces by treating the machine fluids with 0.1 to about 100 parts per million (ppm) of an ethylene oxide/propylene oxide copolymer. More preferably, the aqueous spray includes from about 0.1 to about 20 ppm of the ethylene oxide/propylene oxide copolymer; and most preferably, the aqueous spray includes from about 0.5 to about 10 ppm of the ethylene oxide/propylene oxide copolymer.

Preferably, the ethylene oxide/propylene oxide copolymers of the invention have a molecular weight of from about 2550 to about 3550 daltons (da). More preferably, the ethylene oxide/propylene oxide copolymers of the invention have a molecular weight of from about 2650 to about 3050 da. Most preferably, the ethylene oxide/propylene oxide copolymers of the invention have a molecular weight of from about 2700 to about 2800 da.

The percent of ethylene oxide, in the copolymer of the invention is preferably from about 5 to 30% (by weight) of the final polymer. More preferably, the percent of ethylene oxide in the copolymer of the invention is from about 5 to 20% (by weight) of the final polymer. Most preferably, the percent of ethylene oxide in the copolymer of the invention is from about 5 to 15% (by weight) of the final polymer. According to one embodiment of the invention the polymer of the invention is not a copolymer, but is a homopolymer of propylene oxide.

The ethylene oxide/propylene oxide copolymers of the invention will contain less than 1 percent by weight of an initiator compound. An initiator is a compound used during synthesis which acts as a nucleus for the attachment of the ethylene oxide and propylene oxide. Examples of initiators include ethylene glycol, propylene glycol and ethylene diamine.

According to one embodiment of the invention the formulations of the invention include a solvent which aids the ethylene oxide/propylene oxide copolymer to enter the aqueous phase. Preferred solvents include water soluble solvents, such as glycol ethers, glycols and alcohols. More preferably, the solvents of the invention are glycols and glycol ethers. Most preferably, the solvents of the invention are glycols.

According to one embodiment of the invention the solvent is a glycol ether and is selected from the group consisting of diethylene glycol monobutyl ether, ethylene glycol monobutyl ether, propylene glycol monobutyl ether, diethylene glycol monoethyl ether, ethylene glycol monoethyl ether, diethylene glycol monohexyl ether, propoxy propanol, ethylene glycol monohexyl ether, diethylene glycol monomethyl ether, propylene glycol methyl ether, dipropylene glycol methyl ether, and tripropylene glycol methyl ether.

In a more preferred embodiment the solvent is a glycol and is selected from the group consisting of propylene glycol, ethylene glycol, and diethylene glycol. Preferred alcohol solvents include benzyl alcohol, ethanol, methanol and propanol. Other preferred solvents of the invention are N-methyl pyrolidone, tetrahydrofuran, tetrahydrofurfuryl alcohol and furfuryl alcohol.

The solvents of the invention are included in the formulations of the invention and in an amount of from about 99 to 0 weight percent. More preferably the solvents of the invention are included in the formulations of the invention in an amount of from about 60 to about 20 weight percent; and most preferably in an amount from about 50 to about 30 weight percent.

In one embodiment of the invention, the method further comprises adding a compound selected from the group consisting of glutaraldehyde, isothiazolin, methylene bis thiocyanate thiocyanomethylthio benzothiazole 2-bromo, 2-nitro, 1–3 propane diol, alkyl dimethyl benzyl ammonium chloride and combinations thereof as a biocidal agent.

The following examples are presented to describe preferred embodiments and utilities of the invention and are not meant to limit the invention unless otherwise stated in the claims appended hereto.

Example 1

A jar test was conducted to demonstrate the ability of the formulations of the invention to interfere with the attachment of filamentous bacteria to surfaces. The formulations of the invention are applied to the papermachine fluids to prevent the attachment of microorganisms to machine surfaces and thereby prevents contamination of the machine by filamentous and other bacteria. Furthermore, by preventing the attachment of the biofilm, the invention will also help prevent contamination by wood fibers and fillers.

Example 2

A filamentous, slime-forming bacterium common to papermills was grown in a modified nutrient medium designed to promote biofilm formation. The uniform inoculum was harvested and aliquots were frozen and stored at 70° C. until needed.

Eight-ounce flush glass jars were rinsed once in acetone and twice in deionized water to remove any surface contaminants. The jars were autoclaved at 121° C. for 15 minutes. One percent solutions of EOPO copolymers of various molecular weights diluted in ethanol were passed though 0.45 μm filters for sterilization. Predetermined volumes of the EOPO solutions were added to the appropriate jars and the ethanol was allowed to evaporate under a stream of sterile air. COMPOUND A represents the compound used in the claimed method and has a molecular weight of from about 2550 to about 3550 daltons. COMPOUND B has a molecular weight of about 2000 daltons. COMPOUND C has a molecular weight of about 4400 daltons. COMPOUND D has a molecular weight of about 3800 daltons. COMPOUND E has a molecular weight of about 1100 daltons.

Fifty mL of sterile medium was added to each jar and 100 μl of the thawed bacterial inoculum was added to each jar. The jars were placed into a New Brunswick Series 25 orbital shaker at 35° C. at 210 rpm. After 48 hours of incubation the biofilms attached and formed at the base of the jars were rated for diameter in centimeters and vigor on a scale of 0 to +4. A geometric mean of diameter and vigor was calculated for each jar. Each experiment was set up with a minimum of three jars per concentration and treatment chemical.

Multiple comparison of treatment affects are displayed in FIGS. 1 and 2. FIG. 1 shows that with COMPOUND A the geometric mean of diameter and vigor at a five ppm dose is significantly better than the other four chemicals in preventing microbial attachment to surfaces since a lower response number indicates a more active chemical.

FIG. 2 shows the same response at 5 and 15 ppm when COMPOUND A is compared to other dispersing chemicals. At 30 ppm this affect diminishes, since both COMPOUND B and COMPOUND A completely prevented adhesion in this study. Overlap indicates no significant difference at 95% Confidence Level.

Figure 3:
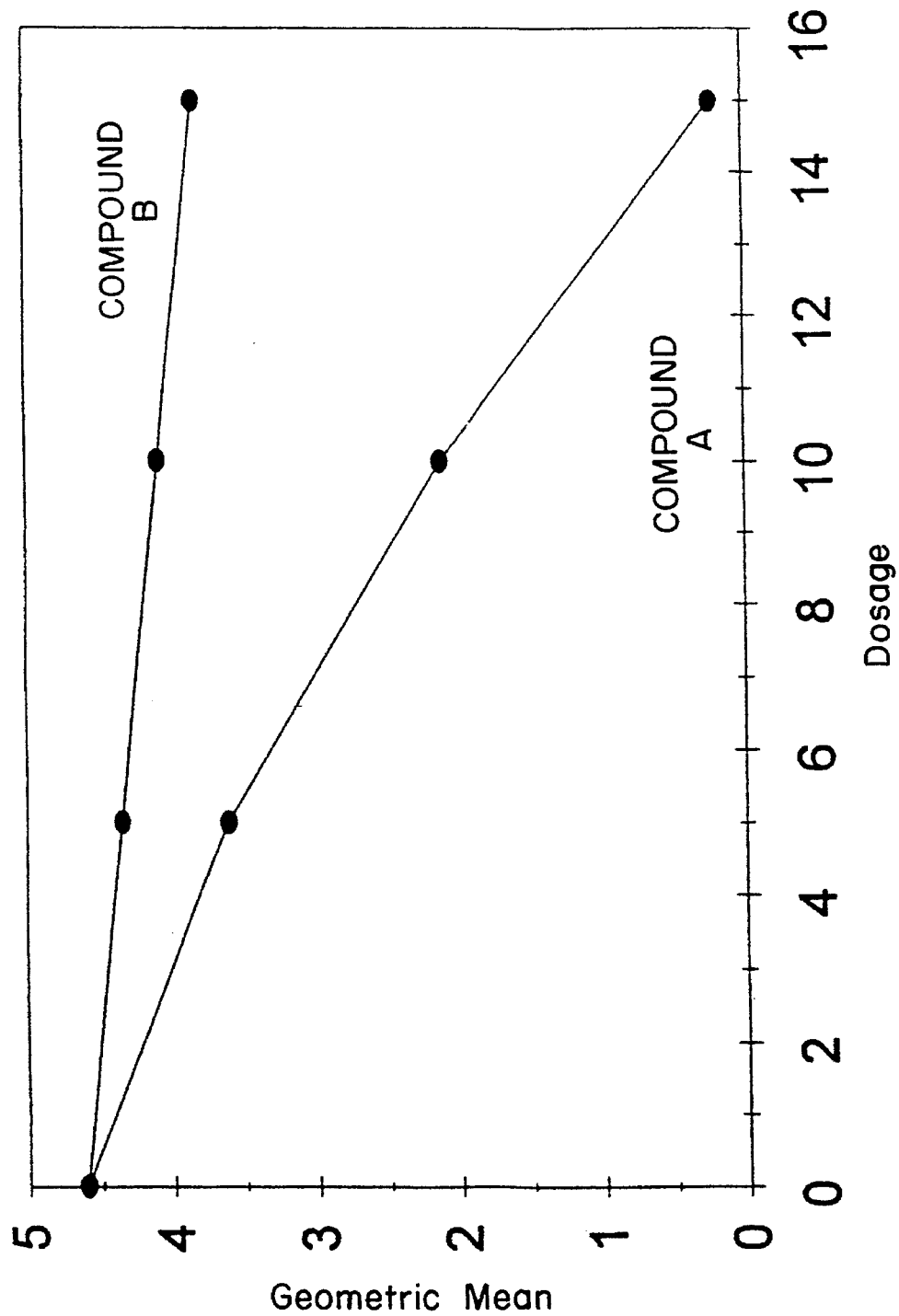
FIG. 3 is a graph comparing the efficacy of two different EOPO polymers at various dosages.

FIG. 3 compares the activity of the currently marketed COMPOUND B against COMPOUND A in a separate experiment. COMPOUND A is much better at preventing attachment of the bacteria to surfaces at a lower dose than is COMPOUND B.

Changes can be made in the composition, operation and arrangement of the method of the present invention described herein without departing from the concept and scope of the invention as defined in the following claims:

We claim:

1. A method of preventing the build-up of deposit-forming microorganisms and inorganic materials in a papermachine fluid, the method consisting of the step of treating the paper machine fluid with an aqueous solution consisting of 0.1 to 100 parts per million of an ethylene oxide/propylene oxide copolymer, wherein the percent of the ethylene oxide in the copolymer is from about 5 to 30% and wherein the copolymer has a molecular weight of from about 2550 to about 3550 daltons.

2. A method of preventing the build-up of deposit-forming microorganisms and inorganic materials in a papermachine fluid, the method consisting of the step of treating the paper machine fluid with an aqueous solution consisting of 0.1 to 100 parts per million of an ethylene oxide/propylene oxide copolymer and glycol, wherein the percent of the ethylene oxide in the copolymer is from about 5 to 30%; and wherein the copolymer has a molecular weight of from about 2550 to about 3550 daltons.

3. The method of claim 2, wherein the glycol is selected from the group consisting of diethylene glycol, ethylene glycol, and propylene glycol.

4. A method of preventing the build-up of deposit-forming microorganisms and inorganic materials in a papermachine fluid, the method consisting of the step of treating the paper machine fluid with an aqueous solution consisting of 0.1 to 100 parts per million of an ethylene oxide/propylene oxide copolymer and a solvent selected from the group consisting of N-methyl pyrolidone, tetrahydrofuran, tetrahydrofurfuryl alcohol and furfuryl alcohol, wherein the percent of the ethylene oxide in the copolymer it from about 5 to 30%; wherein the copolymer has a molecular weight of from about 2550 to about 3550 daltons.

5. A method of preventing the build-up of deposit-forming microorganisms and inorganic materials in a papermachine fluid, the method consisting of the step of treating the paper machine fluid with an aqueous solution consisting of 0.1 to 100 parts per million of an ethylene oxide/propylene oxide copolymer and a compound selected from the group consisting of glutaraldehyde, isothiazolin, methylene bis thiocyanate thiocyanomethylthio benzothiazole 2-bromo, 2-nitro, 1–3 propane diol, alkyl dimethyl benzyl ammonium chloride and combinations thereof, wherein the percent of the ethylene oxide in the copolymer is from about 5 to 30%; wherein the copolymer has a molecular weight of from about 2550 to about 3550 daltons.

\* \* \* \* \*

UNITED STATES PATENT AND TRADEMARK OFFICE
CERTIFICATE OF CORRECTION

PATENT NO. : 5,573,641
DATED : November 12, 1996
INVENTOR(S) : Robert J. Meade, el al It is certified that error appears in the above-indentified patent and that said Letters Patent is hereby corrected as shown below:

Column 4, line 44, claim 4, ethylene oxide in the copolymer it from about 5 to 30%

LETTERS PATENT SHOULD READ AS:

ethylene oxide in the copolymer is from about 5 to 30%

Signed and Sealed this

Seventh Day of January, 1997

Attest:

BRUCE LEHMAN

Attesting Officer

Commissioner of Patents and Trademarks